United States Patent
Berruet et al.

(10) Patent No.: US 8,939,650 B2
(45) Date of Patent: Jan. 27, 2015

(54) BEARING, BEARING ASSEMBLY COMPRISING SUCH A BEARING AND TURBOCHARGER COMPRISING SUCH A BEARING ASSEMBLY

(71) Applicants: Nicolas Berruet, Artannes sur Indre (FR); Richard Corbett, Fondettes (FR); Samuel Viault, Saint Antoine du Rocher (FR); Jun Wang, Delfgauw (NL); Jeroen Wensing, WP Houten (NL)

(72) Inventors: Nicolas Berruet, Artannes sur Indre (FR); Richard Corbett, Fondettes (FR); Samuel Viault, Saint Antoine du Rocher (FR); Jun Wang, Delfgauw (NL); Jeroen Wensing, WP Houten (NL)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 13/868,046

(22) Filed: Apr. 22, 2013

(65) Prior Publication Data

US 2013/0287547 A1    Oct. 31, 2013

(30) Foreign Application Priority Data

Apr. 23, 2012  (EP) .................................... 12305470

(51) Int. Cl.
| | | |
|---|---|---|
| *F16C 19/00* | (2006.01) |
| *F01D 11/00* | (2006.01) |
| *F01D 25/16* | (2006.01) |
| *F16C 33/66* | (2006.01) |
| *F16C 19/18* | (2006.01) |
| *F16C 33/58* | (2006.01) |

(52) U.S. Cl.
CPC ............ *F01D 25/16* (2013.01); *F16C 33/6659* (2013.01); *F16C 33/66* (2013.01); *F16C 33/6681* (2013.01); *F16C 19/184* (2013.01); *F16C 33/58* (2013.01); *F16C 2360/24* (2013.01)
USPC .......................................... 384/475; 415/111

(58) Field of Classification Search
USPC ............ 384/99, 462, 474, 475, 490; 415/111, 415/112
See application file for complete search history.

(56) References Cited

U.S. PATENT DOCUMENTS

| | | | | |
|---|---|---|---|---|
| 4,997,290 | A * | 3/1991 | Aida | ................................ 384/99 |
| 5,007,504 | A | 4/1991 | Hallbach | |
| 5,076,766 | A | 12/1991 | Gutknecht | |
| 7,987,599 | B2 * | 8/2011 | Mavrosakis | ................... 384/462 |
| 8,602,652 | B1 * | 12/2013 | Bradshaw | ........................ 384/99 |
| 2008/0098735 | A1 | 5/2008 | Gutknecht | |
| 2008/0267548 | A1 | 10/2008 | Chriss | |

* cited by examiner

*Primary Examiner* — James Pilkington

(74) *Attorney, Agent, or Firm* — Bryan Peckjian; SKF USA Inc. Patent Department

(57) ABSTRACT

This bearing comprises a fixed outer ring and a rotatable inner ring, and at least one lubrication ring having at least one lubrication duct extending between an outer surface and an inner surface of the lubrication ring. The at least one lubrication duct is placed so that the scalar product of a vector collinear to the longitudinal axis of the lubrication duct, and a vector (VL1) collinear to the tangent line (L1) to an outer cylindrical surface of the inner ring, at the point where the longitudinal axis of the lubrication duct (270) intersects the outer cylindrical surface of the inner ring, and oriented in the same direction as the rotation direction (F) of the inner ring, is strictly superior to zero, said vectors being projected in a plane (P2) perpendicular to the rotation axis of the bearing.

17 Claims, 7 Drawing Sheets

BEARING, BEARING ASSEMBLY COMPRISING SUCH A BEARING AND TURBOCHARGER COMPRISING SUCH A BEARING ASSEMBLY

TECHNICAL FIELD OF THE INVENTION

The present invention concerns a bearing comprising a fixed outer ring and a rotatable ring, and at least one lubrication ring comprising at least one lubrication duct extending between an outer surface of the lubrication ring and an inner surface of the lubrication ring. The invention also concerns a bearing assembly comprising such a bearing, and a turbocharger comprising such a bearing assembly.

BACKGROUND OF THE INVENTION

It is known to provide bearings with dedicated lubrication systems in order to extend their service life and increase their rotation speed. This technique is in particular used in turbochargers, where high rotation speeds are involved. These lubrication systems often include ducts extending through the outer ring of the bearing in order to allow passage of oil, or more generally lubricant, in the inside of the bearing in order to facilitate the relative rotation of the inner and outer rings. The lubricant is injected with pressure, from ducts provided in a housing in which the bearing is mounted, through the lubrication ducts of the outer ring.

Lubricant injection techniques known, for example, from US-A-2008/098735, use lubricant injection ducts which are perpendicular to the rotation axis of the bearing and enter in the interior of the bearing along a purely radial direction perpendicular with respect to the rotation axis of the inner ring. This technique causes bad lubricant reparation and can lead to solid deposits in case the lubricant reaches high temperatures. Moreover, the radial injection of oil creates a resistive torque exerted against the rotation of the inner ring.

SUMMARY OF THE INVENTION

The aim of the invention is to provide a new bearing in which the lubricant injection through lubrication ducts in a lubrication ring is improved, so that the lubricant repartition in the bearing allows better operating conditions and higher rotation speeds.

To this end, the invention concerns a bearing including a fixed outer ring, a rotatable inner ring, and at least one lubrication ring comprising at least one lubrication duct extending between an outer surface of the lubrication ring and an inner surface of the lubrication ring. This bearing is characterized in that the or each lubrication duct of the lubrication ring is placed so that the scalar product of a vector collinear to the longitudinal axis of the lubrication duct, and a vector collinear to the tangent line to an outer cylindrical surface of the inner ring, at the point where the longitudinal axis of the lubrication duct intersects the outer cylindrical surface of the inner ring, and oriented in the same direction as the rotation direction of the inner ring, is strictly superior to zero, said vectors being projected in a plane perpendicular to the rotation axis of the bearing.

Thanks to the invention, lubricant is injected along a direction which allows oil to better spread in the interior of the bearing by avoiding the drawbacks of the radial injection. The pressure of the lubricant injection reduces the friction torque which exists between the inner and the outer ring, because the lubricant flow goes in the same rotation direction to the inner ring.

According to further aspects of the invention which are advantageous but not compulsory, such a bearing may incorporate one or several of the following features:

The at least one lubrication ring is the fixed outer ring.

The at least one lubrication ring is adjacent to the fixed outer ring, along the rotation axis of the bearing.

For the or each lubrication duct of the lubrication ring, an injection angle is formed, on the one hand, by the longitudinal axis of the lubrication duct of the lubrication ring, and on the other hand, by the tangent line, whereas the or each lubrication duct of the lubrication ring is placed so that the injection angle is comprised between 0° and 85° strictly, said angle being projected in a plane perpendicular to the rotation axis of the bearing.

The injection angle is comprised between 0° and 10°.

The injection angle is comprised between 0° and 5°.

The or each lubrication duct of the lubrication ring is inclined with respect to a plane perpendicular to the rotation axis of the bearing.

The inclination angle of the or each lubrication duct with respect for the plane perpendicular to the rotation axis of the bearing is comprised between 5° and 45°, and preferably equal to 20°.

The bearing is a rolling bearing having raceways tracks on the inner and outer rings between which rolling elements are mounted, whereas an outer surface of the inner ring comprises grooves adapted to convey lubricant from an area where it is injected through the or each lubrication duct of the lubrication ring to the raceways tracks of the inner ring of the bearing.

The grooves are located and regularly distributed on a cylindrical surface of a protruding portion of the inner ring.

The grooves are inclined with respect to a line tangent to the cylindrical surface of the protruding portion and parallel to the rotation axis of the bearing.

The inclination angle of the grooves with respect to the line tangent to the cylindrical surface of the protruding portion is comprised between 30° and 60°.

The inner ring comprises two parts mounted against each other along the rotation axis of the bearing, whereas the lubrication ring comprises a first set of lubrication ducts for lubricating a first set of rolling elements mounted between a first part of the inner ring and the outer ring, and a second set of lubrication ducts for lubricating a second set of rolling elements mounted between the second part of the inner ring and the outer ring.

Both sets of lubrication ducts of the lubrication ring comprise four lubrication ducts.

At least one set of lubrication ducts of the outer ring comprises equally angularly spaced lubrication ducts.

The first and the second sets of lubrication ducts of the lubrication ring comprise a different number of lubrication ducts.

The first set of lubrication ducts comprises a single lubrication duct, while the second set of lubrication ducts comprises four lubrication ducts.

The invention also concerns a bearing assembly comprising a rotatable element, a bearing as mentioned here above, and a housing. This bearing assembly is characterized in that the housing comprises at least one lubrication duct for lubricating the bearing, said lubrication duct opening on a cylindrical inner surface of the housing, in that the rotatable element is fast in rotation with the inner ring of the bearing, in that the outer ring is mounted in the housing, and in that the or each lubrication duct of the outer ring of the bearing is in the extension of the or each lubrication duct of the housing.

The invention also concerns a turbocharger comprising a bearing assembly as mentioned here above or provided with a rotatable element, a housing, and a bearing as mentioned here above.

BRIEF DESCRIPTION OF THE DRAWINGS

The invention will now be explained in correspondence with the annexed figures, as an illustrative example. In the annexed figures.

DETAILED DESCRIPTION OF SOME EMBODIMENTS

Figure 5:
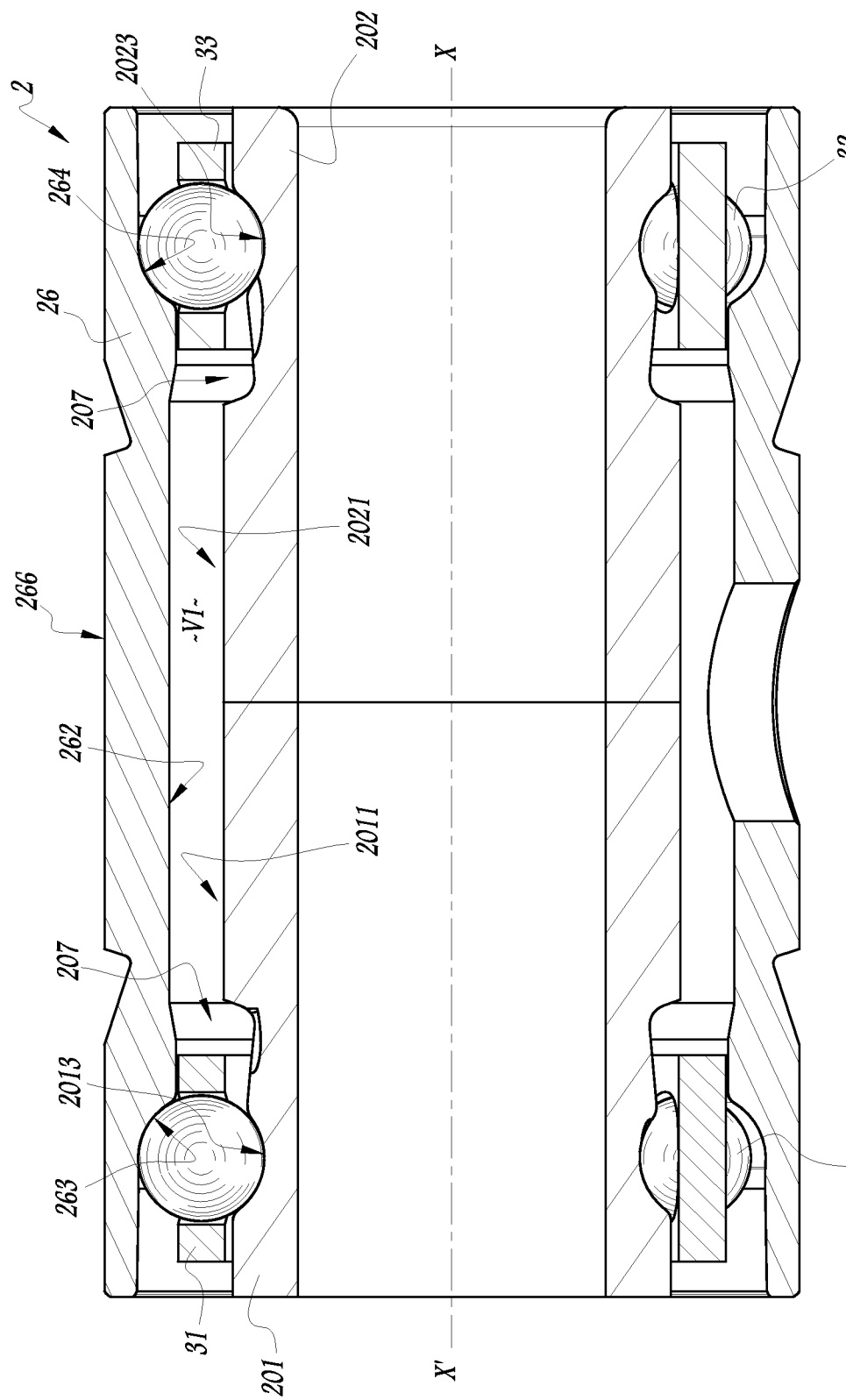
FIG. 5 is a longitudinal sectional view of the bearing of FIGS. 1 to 4.

The bearing 2 represented on the figures comprises an inner ring 20 and an outer ring 26. Inner ring 20 is divided into two parts 201 and 202 which are mounted against each other, along a longitudinal rotation axis X-X' of bearing 2, as shown on FIG. 5.

Bearing 2 comprises rolling elements adapted to facilitate rotation of inner ring 20 with respect to outer ring 26 in the direction of arrow F. More precisely, bearing 2 comprises a first set of balls 30 mounted in a cage 31 between first part 201 of inner ring 20 and outer ring 26. Bearing 2 comprises also a second set of balls 32 mounted in a cage 33 between the second part 202 of inner ring 20 and outer ring 26. First set of balls 30 and second set of balls 32 are located in the vicinity of the axial ends of bearing 2. Outer ring 26 comprises, on an inner cylindrical surface 262, raceway tracks 263 and 264 in which first set of balls 30 and second set of balls 32 are respectively mounted.

First part 201 comprises, on an outer cylindrical surface 2011, a raceway track 2013 in which first set of balls 30 is mounted. Similarly, part 202 comprises, on an outer cylindrical surface 2021, a raceway track 2023 in which second set of balls 32 is mounted.

Figure 3:
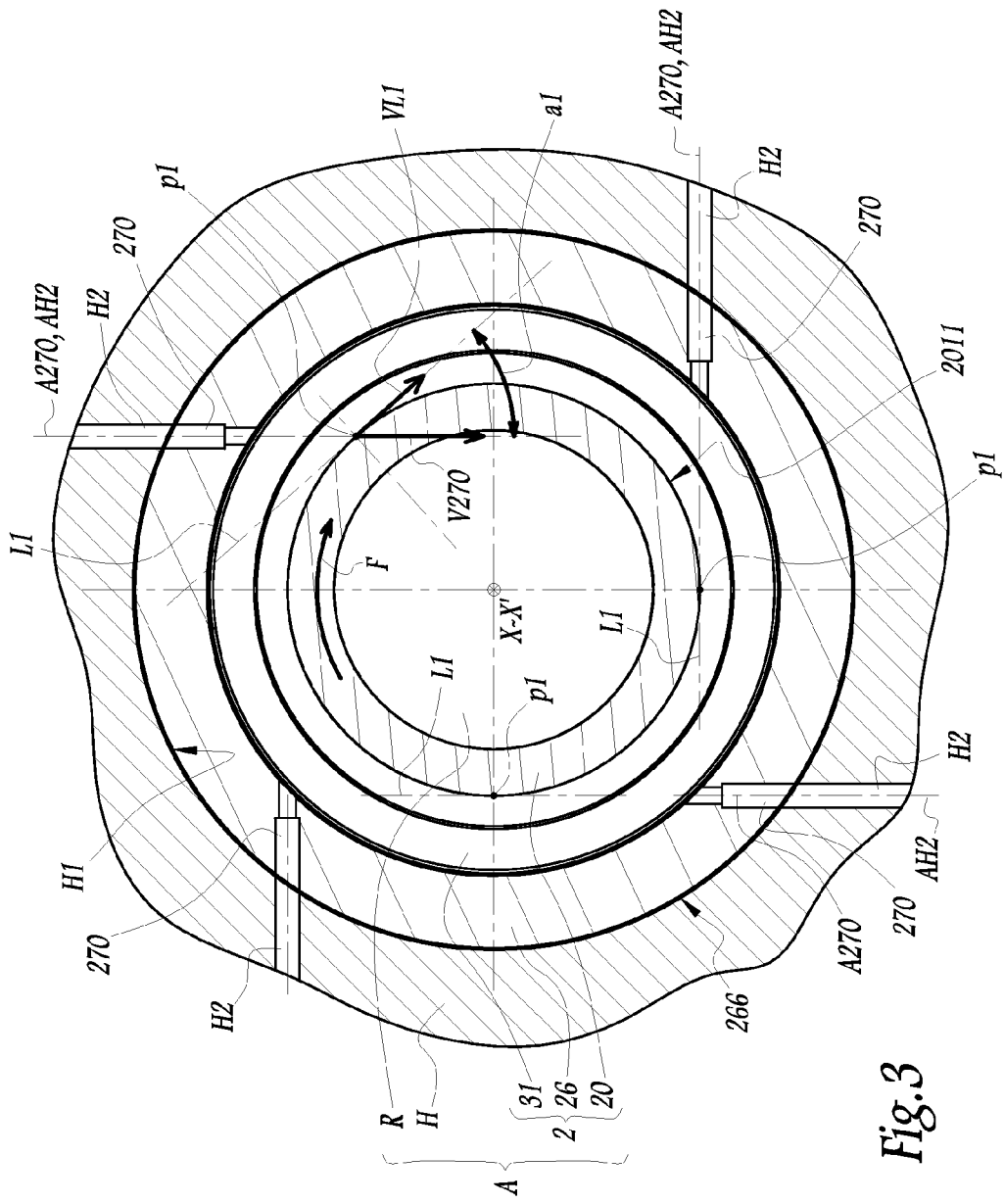
FIG. 3 is a cross sectional view, along line III-III, of the bearing of FIGS. 1 and 2, mounted in a housing.

On FIG. 3, bearing 2 is mounted in a housing H. A rotatable element R is fast in rotation with inner ring 20, so that it can rotate with respect to housing H. Rotatable element R can be, for example, a shaft of a turbocharger. Bearing 2, housing H and rotatable element R together form a bearing assembly A.

In order to improve the service life of bearing 2 and increase its rotation speed range, bearing 2 is equipped with a lubrication system. Housing H comprises at least one lubrication duct H2 which opens on a cylindrical inner surface H1 of housing H. Outer ring 26 is mounted in housing H so that an outer surface 266 of outer ring 26 lies against cylindrical inner surface H1 of housing H. Lubrication ducts H2 of housing H are fed with lubricant from a non-shown lubricant tank.

In order to allow lubricant to get from ducts H2 to the interior of bearing 2, outer ring 26 comprises lubrication ducts 270 extending between outer surface 266 and inner cylindrical surface 262, so that lubricant can enter in an annular volume V1 extending between inner ring 20 and outer ring 26 and spread into sets of balls 30 and 32 and their corresponding raceway tracks. Outer ring 26 plays the role of a "lubrication ring".

Outer ring or lubrication ring 26 comprises at least one lubrication duct 270 which is positioned with respect to outer ring 26 so that the lubricant reparation is improved. Each lubrication duct 270 extends around a longitudinal axis or injection direction A270 which is in the extension of a corresponding lubrication duct H2 of housing H. In other words, axis A270 is aligned with a central axis AH12.

A line L1 denotes the tangent line to the outer surface 2011 or 2021 of inner ring 20, at a point p1 where longitudinal axis A270 intersects inner ring 20.

To reduce the friction torque between the balls and the outer and inner rings, lubricant is injected so that its pressure contributes to the rotation of inner ring 20. Lubrication ducts 270 are placed so that, for each duct 270, the scalar product between a vector V270 collinear to longitudinal axis A270 and a vector VL1 collinear to tangent line L1 and oriented in the same direction as the rotation direction F of inner ring 20, said vectors being projected in a plane P2 perpendicular to rotation axis X-X', is strictly superior to zero. Zero value is excluded, which means vectors V270 and VL1 cannot be perpendicular. In other words, the position of lubrication duct 270 when injection direction A270 is perpendicular to the tangent line L1, as known from the prior art, is excluded.

An injection angle a1 is formed for each lubrication duct 270, on the one hand, by longitudinal axis A270, and, on the other hand, by tangent line L1. This injection angle a1 is projected in plane P2, as if bearing 2 were viewed along the direction of rotation axis X-X'. When injection direction A270 is perpendicular to tangent line L1, injection angle a1 equals 90°. When injection direction A270 is aligned with tangent line L1, injection angle a1 equals 0°. To have a better lubricant diffusion in the interior of bearing 2, injection angle a1 is comprised between 0° and 85°. Preferably, injection angle a1 is comprised between 0° and 10°, more preferably between 0° and 5°. Angle a1 is represented in relation with the lubrication duct 270 located in the upper right corner of FIG. 3, its value being substantially superior to zero.

It has been found that the best position for lubrication duct 270 is when injection angle a1 equals 0° as shown for the ducts 270 located on the left side and lower right corner of FIG. 3, because in this configuration, the contribution of the lubricant injection pressure to the rotation of inner ring 20 relative to outer ring 26 is maximal. This reduces the friction torque, improves the robustness of bearing 2 and permits higher rotation speeds.

Figure 1:
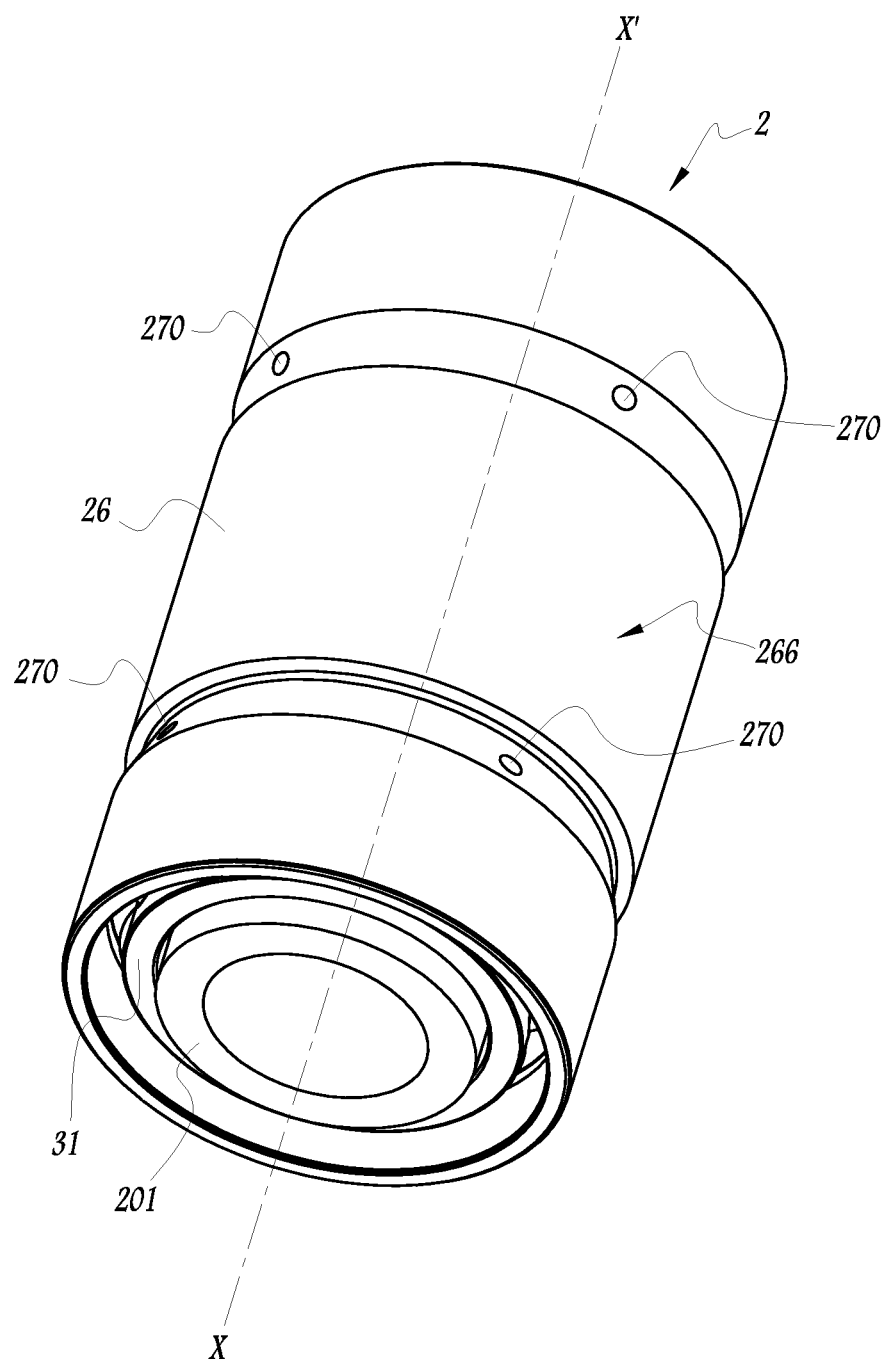
FIG. 1 is a perspective view of a bearing according to the invention.
Figure 2:
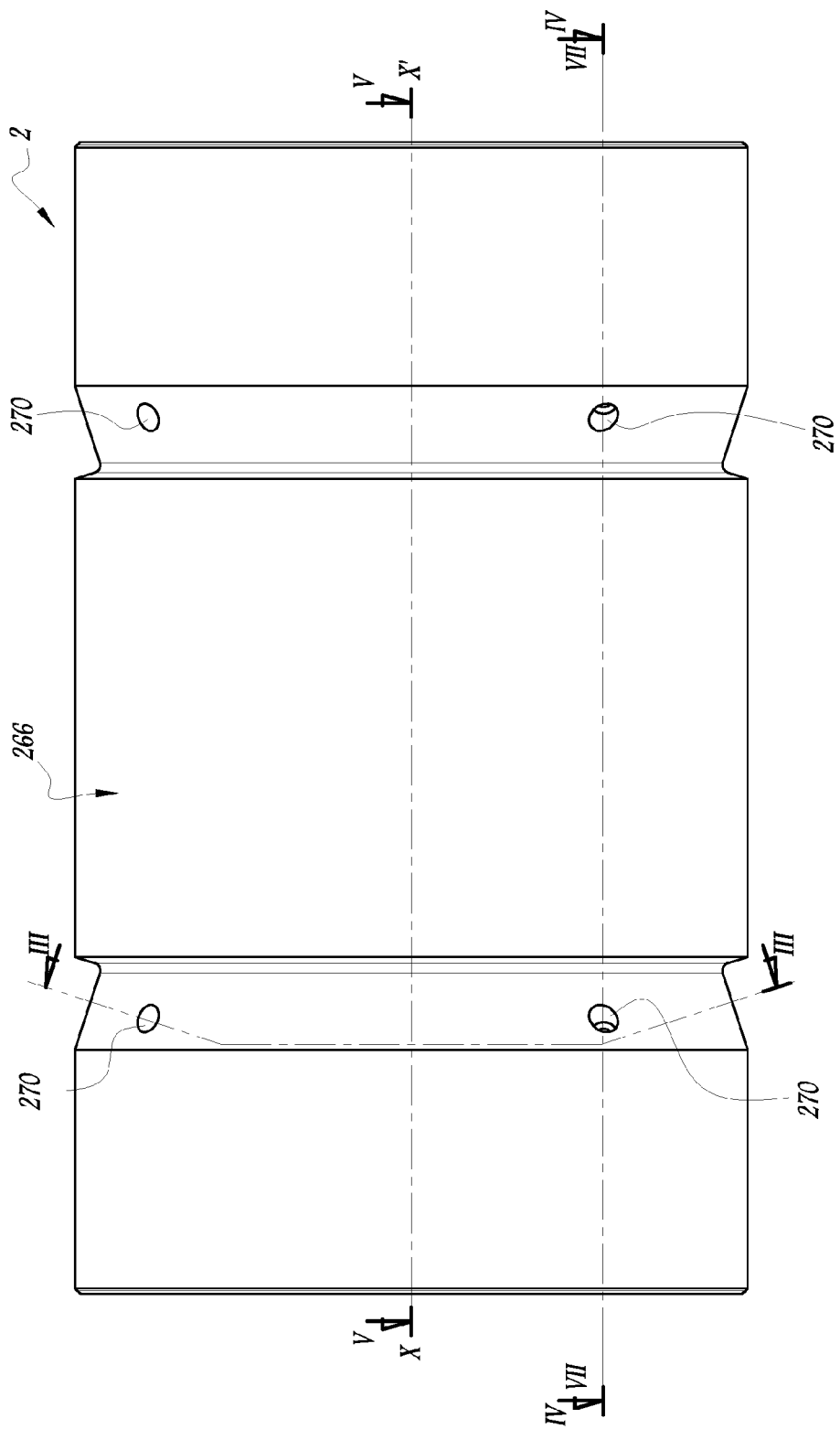
FIG. 2 is a side view of the bearing of FIG. 1.

Outer ring 26 comprises, for each set of balls 30 and 32, a dedicated set of lubrication ducts 270 adapted to respectively inject the lubricant in volume V1 in the vicinity of first set of balls 30 and second set of balls 32. First and second sets of lubrication ducts 270 may comprise the same number of lubrication ducts 270. Outer ring 26 may comprise, for each set of balls 30 and 32, four lubrication ducts 270, only two being shown on FIG. 2. In such a case, each lubrication duct 270 has its longitudinal axis A270 shifted by an angle of 90° with respect to the longitudinal axis of the adjacent lubrication ducts, as shown on FIG. 3. As a variant, lubrication ducts 270 regularly distributed around the circumference of outer ring 26.

According to a non-shown embodiment, each set of lubrication ducts can comprise a different number of lubrication ducts. For example, first set of lubrication duct can comprise only one lubrication duct, while the second set of lubrication duct can comprise four lubrication ducts.

Figure 4:
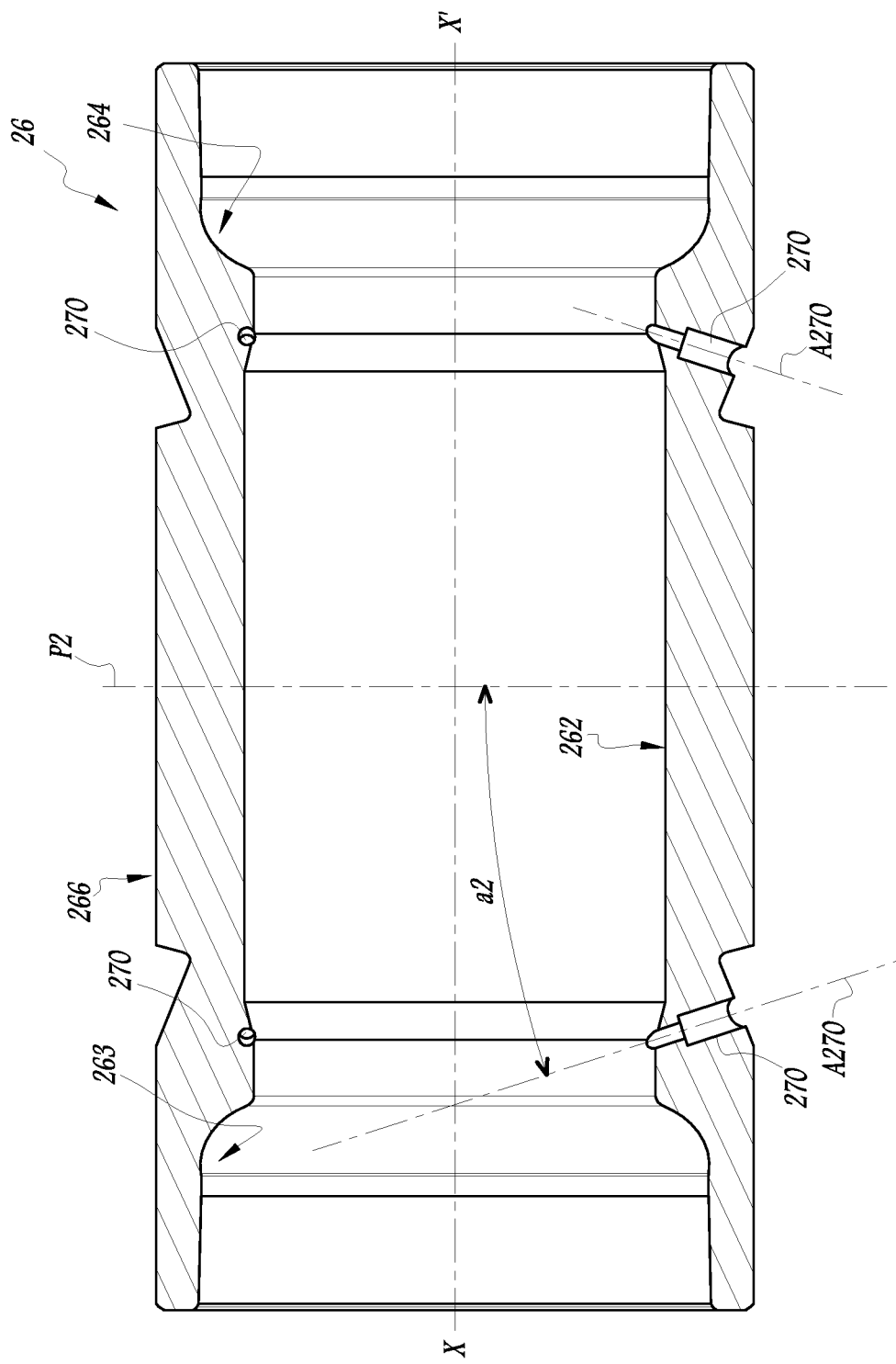
FIG. 4 is a longitudinal sectional view along plane IV on FIG. 2, of the outer ring of the bearing of FIGS. 1 to 3.

According to an optional feature, at least one lubrication duct 270 of the outer ring 26 is inclined with respect to a plane parallel to plane P2, by an inclination angle a2 represented on the left portion of FIG. 4. The value of angle a2 may be comprised between 5° and 45°, and preferably equal to 20°. This permits to better orientate the lubricant injection towards the critical areas where lubrication is specifically needed, particularly the raceway tracks.

Figure 6:
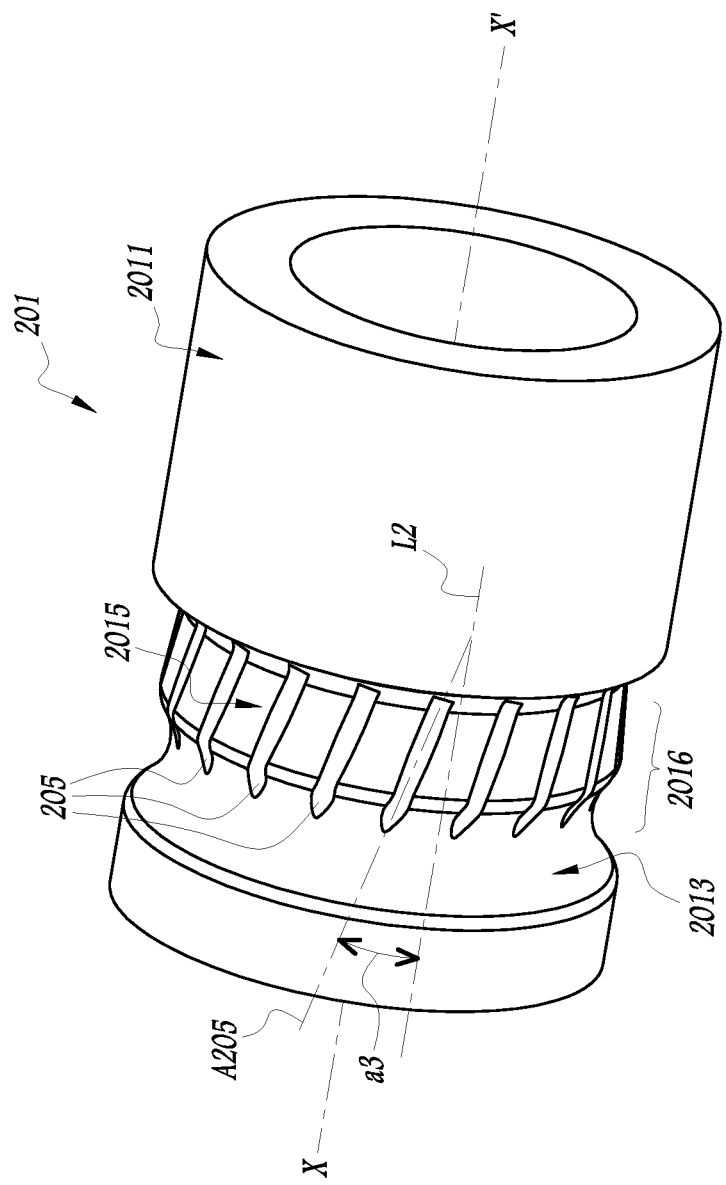
FIG. 6 is a perspective view of an inner ring belonging to a bearing according to a second embodiment of the invention.
Figure 7:
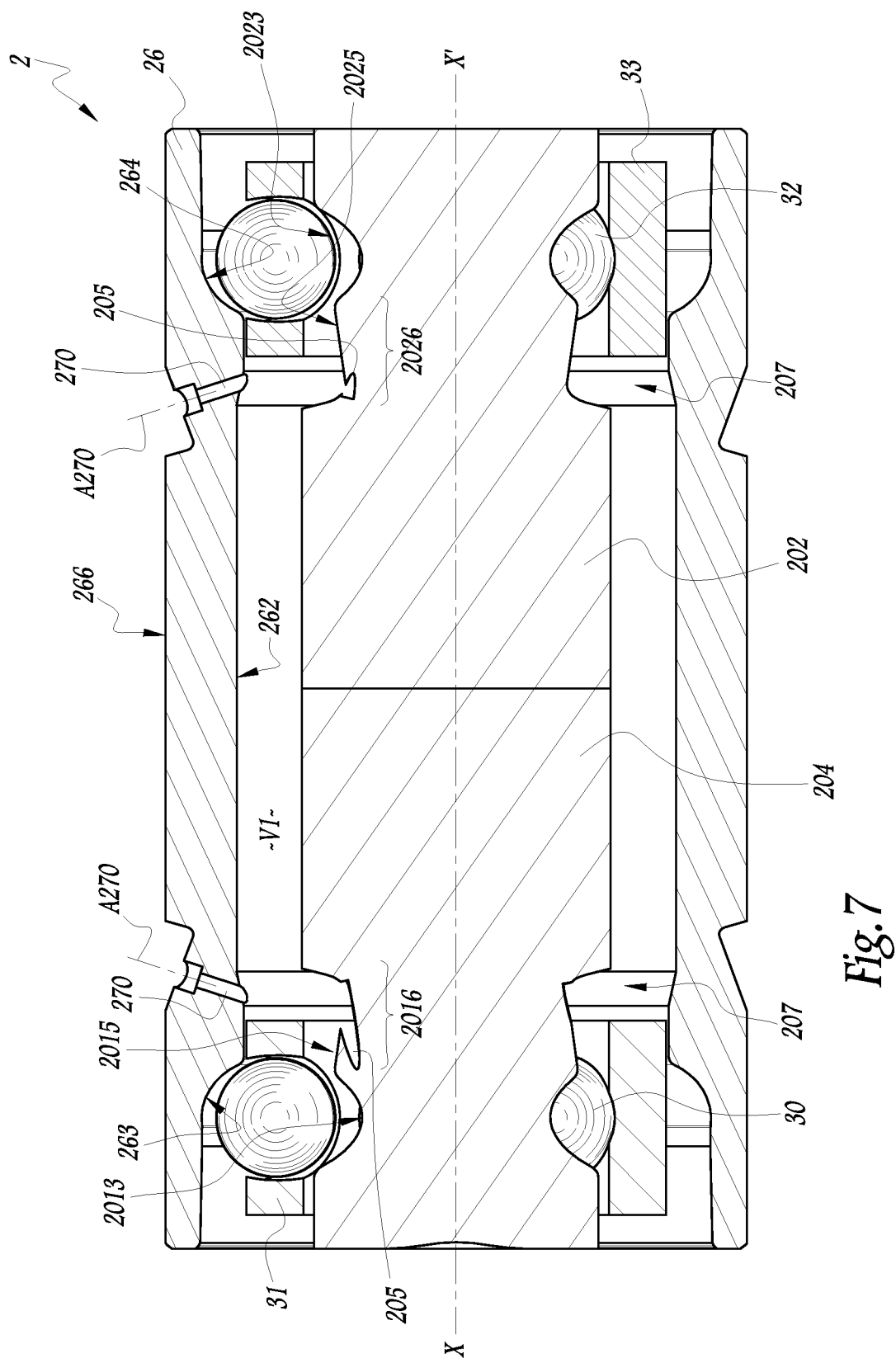
FIG. 7 is a longitudinal sectional view along plane similar to plane VII on FIG. 2, of a bearing according to a second embodiment of the invention.

A second embodiment of the invention is represented on FIGS. 6 and 7. In order to optimise the lubricant repartition and circulation towards raceway tracks 2013, 2023, 263 and 264, inner ring 20 comprises, on outer surfaces 2011 and 2021, grooves 205 which convey lubricant, from an area 207 where lubricant is injected through lubrication ducts 270 and gets onto outer surface 2011 or 2021, to raceway tracks 2013 and 2023 of inner ring 20. Grooves 205 are parallel to each other and located, in a regular distribution, on cylindrical surfaces 2015 and 2025 respectively provided on protruding portions 2016 and 2026 of parts 201 and 202 of inner ring 20.

As shown on FIG. 6 for the right part 201 of inner ring 20, grooves 205 are inclined, with respect to a line L2 tangent to cylindrical surfaces 2015 and 2025 and parallel to axis X-X', by an inclination angle a3 defined between a longitudinal axis A205 of grooves 205 and tangent line L2. The value of angle a3 may be comprised between 30° and 60°. Thanks to the rotation of inner ring 20, lubricant acquires in grooves 205 a supplementary flow speed which improves the lubrication of raceway tracks 2013 and 2023.

According to a non-shown embodiment, bearing 2 can comprise an inner ring made of a single part and a single set of rolling elements.

According to another non-shown embodiment, bearing 2 can comprise different types of rolling elements, such as rollers or needles.

According to a non-shown embodiment, bearing 2 can be a plain bearing comprising only an inner ring and an outer ring mounted coaxially against each other.

According to a non-shown embodiment of the invention, rolling bearing 2 can include a lubrication ring distinct from outer ring 26, i.e. provided by a separate part. As an example, such a structure can be implemented with a bearing having a single row of rolling elements, and a generic outer ring which is narrower, along the rotation axis of the bearing, than the inner ring. In such a case, the lubrication ring is provided as a supplementary fixed ring mounted around the inner ring and adjacent, along the rotation axis of the bearing, to the generic outer ring. The lubrication ducts are realized on the distinct lubrication ring with injection angles geometry similar to the previously described embodiment.

It should be noted that the previously illustrated and described embodiments were given merely by way of non-limiting indicative examples and that modifications and variations are possible within the scope of the invention. The invention can apply to turbochargers, waste heat recovery turbines, turbocompounds or compressors. The bearing can comprise an angular contact ball rolling bearing with a double row of balls but can also comprise other types of bearing arrangements, for example rolling bearing having four contact points and/or with a single row of balls or with at least three rows of balls.

The invention claimed is:

1. A bearing comprising:
    a fixed outer ring forming a lubrication ring having at least one lubrication duct extending between an outer surface and an inner surface of the outer ring,
    a rotatable inner ring, and
    wherein the at least one lubrication duct of the lubrication ring is placed so that the scalar product of:
        a vector collinear to a longitudinal axis of the lubrication duct, and
        a vector collinear to a tangent line to an outer cylindrical surface of the inner ring, at the point where the longitudinal axis of the lubrication duct intersects the outer cylindrical surface of the inner ring, and oriented in the same direction as a rotation direction of the inner ring, is greater than zero, and wherein
    the vectors are projected in a plane perpendicular to a rotation axis of the bearing.

2. The bearing according to claim 1, wherein a first injection angle (a1) is formed for each lubrication duct, by the longitudinal axis of the at least one lubrication duct of the at least one lubrication ring, and by the tangent line (L1), and wherein each lubrication duct is placed so that the injection angle (a1) is between zero (0) degrees and eighty-five (85) degrees, the angle being projected in a plane (P2) perpendicular to the rotation axis (X-X') of the bearing.

3. The bearing according to claim 2, wherein the injection angle (a1) is between zero (0) degrees and ten (10) degrees.

4. The bearing according to claim 2, wherein the injection angle (a1) is between zero (0) degrees and five (5) degrees.

5. The bearing according to claim 1, wherein the at least one lubrication duct of the lubrication ring is inclined with respect to a plane perpendicular to the rotation axis of the bearing.

6. The bearing according to claim 5, wherein an inclination angle (a2) of the at least one lubrication duct with respect for the plane perpendicular to the rotation axis of the bearing is comprised between five (5) degrees and forty-five (45) degrees.

7. The bearing according to claim 5, wherein the inclination angle (a2) of the at least one lubrication duct with respect for the plane perpendicular to the rotation axis (X-X') of the bearing is twenty (20) degrees.

8. The bearing according to claim 1, further comprising a rolling bearing having raceways tracks on the inner and outer rings between which rolling elements are mounted, and wherein
    an outer surface of the inner ring includes grooves adapted to convey lubricant from an area where it is injected through the at least one lubrication duct of the lubrication ring to the raceways tracks of the inner ring of the bearing.

9. The bearing according to claim 8, wherein the grooves are located and regularly distributed on a cylindrical surface of a protruding portion of the inner ring.

10. The bearing according to claim 9, wherein the grooves are inclined (a3) with respect to a line (L2) tangent to the cylindrical surface of the protruding portion and parallel to the rotation axis of the bearing.

11. The bearing according to claim 10, wherein an inclination angle (a3) of the grooves with respect to the line (L2) tangent to the cylindrical surface of the protruding portion is between thirty (30) degrees and sixty (60) degrees.

12. The bearing according to claim 1, wherein the inner ring comprises two parts mounted against each other along the rotation axis of the bearing, and wherein
    the lubrication ring provides a first set of lubrication ducts for lubricating a first set of rolling elements mounted between a first part of the inner ring and the outer ring, and a second set of lubrication ducts for lubricating a second set of rolling elements mounted between a second part of the inner ring and the outer ring.

13. The bearing according to claim 12, wherein each set of lubrication ducts of the lubrication ring provide two lubrication ducts, providing a total of four lubrication ducts.

14. The bearing according to claim 12, wherein the first and the second sets of lubrication ducts of the lubrication ring include a different number of lubrication ducts.

15. The bearing according to claim 14, wherein the first set of lubrication ducts includes a single lubrication duct, while the second set of lubrication ducts comprises four lubrication ducts.

16. A bearing assembly (A) comprising:
- a rotatable element (R),
- a bearing having;
    - a fixed outer ring forming a lubrication ring having at least one lubrication duct extending between an outer surface and an inner surface of the outer ring,
    - a rotatable inner ring, and
    - wherein the at least one lubrication duct of the lubrication ring is placed so that the scalar product of:
    - a vector collinear to a longitudinal axis of the lubrication duct, and
    - a vector collinear to a tangent line to an outer cylindrical surface of the inner ring, at the point where the longitudinal axis of the lubrication duct intersects the outer cylindrical surface of the inner ring, and oriented in the same direction as a rotation direction of the inner ring, is greater than zero, and wherein
    - the vectors are projected in a plane perpendicular to a rotation axis of the bearing, and
- a housing (H), wherein:
    - the housing (H) comprises at least one lubrication duct (H2) for lubricating the bearing, said lubrication duct opening on a cylindrical inner surface (H1) of the housing (H),
    - the rotatable element (R) is fastened to the inner ring of the bearing so as to rotate with the inner ring,
    - the lubrication ring is mounted in the housing (H), and
    - the at least one lubrication duct of the lubrication ring of the bearing is in an extension of the at least one lubrication duct (H2) of the housing (H).

17. A turbocharger comprising:
- a bearing assembly (A) having;
    - a fixed outer ring forming a lubrication ring having at least one lubrication duct extending between an outer surface and an inner surface of the outer ring,
    - a rotatable inner ring, and
    - wherein the at least one lubrication duct of the lubrication ring is placed so that the scalar product of:
    - a vector collinear to a longitudinal axis of the lubrication duct, and
    - a vector collinear to a tangent line to an outer cylindrical surface of the inner ring, at the point where the longitudinal axis of the lubrication duct intersects the outer cylindrical surface of the inner ring, and oriented in the same direction as a rotation direction of the inner ring, is greater than zero, and wherein
    - the vectors are projected in a plane perpendicular to a rotation axis of the bearing, and
- a housing (H), wherein:
    - the housing (H) comprises at least one lubrication duct (H2) for lubricating the bearing, said lubrication duct opening on a cylindrical inner surface (H1) of the housing (H),
    - the rotatable element (R) is fastened to the inner ring of the bearing so as to rotate with the inner ring,
    - the lubrication ring is mounted in the housing (H), and
    - the at least one lubrication duct of the lubrication ring of the bearing is in an extension of the at least one lubrication duct (H2) of the housing (H).

* * * * *